United States Patent [19]

Dardat et al.

[11] Patent Number: 4,979,579
[45] Date of Patent: Dec. 25, 1990

[54] ELECTRONIC BALANCE

[75] Inventors: Klaus Dardat, Dransfeld; Hans-Heinrich Köhne, Göttingen; Eberhard Lübke, Hardegsen; Jürgen Winkelbach, Friedland, all of Fed. Rep. of Germany

[73] Assignee: Sartorius AG, Göttingen, Fed. Rep. of Germany

[21] Appl. No.: 451,153

[22] Filed: Dec. 15, 1989

[30] Foreign Application Priority Data

Dec. 20, 1988 [DE] Fed. Rep. of Germany ....... 3842806

[51] Int. Cl.$^5$ ............................................. G01G 21/28
[52] U.S. Cl. ..................... 177/180; 177/238
[58] Field of Search ............................... 177/180–182, 177/238

[56] References Cited

U.S. PATENT DOCUMENTS

| 4,465,152 | 8/1984 | Schmitter | 17/180 |
| 4,762,190 | 8/1988 | Meixner | 177/181 |
| 4,798,250 | 1/1989 | Knothe et al. | 177/181 |
| 4,862,979 | 9/1989 | Borchard | 177/181 |

Primary Examiner—George H. Miller, Jr.
Attorney, Agent, or Firm—Eric P. Schellin

[57] ABSTRACT

An electronic balance with a housing, a balance scale, a wind guard which at least partially surrounds the balance scale and with a display and control unit approximately in the plane of the balance scale. The display and control unit is mounted to the hosing in a manner that it can pivot around the wind guard about at least one vertical axis. This allows the balance to better adapt to various work positions of the operator. Further possibilities of adaptation result from the weighing-area opening of a rotationally symmetrical wind guard which opening can be adjusted as desired and also from the possibility of laterally shifting the display and control unit and/or from the possibility of rotating it about a vertical axis within the display and control unit and/or from the possibility of tilting it about a horizontal axis.

7 Claims, 4 Drawing Sheets

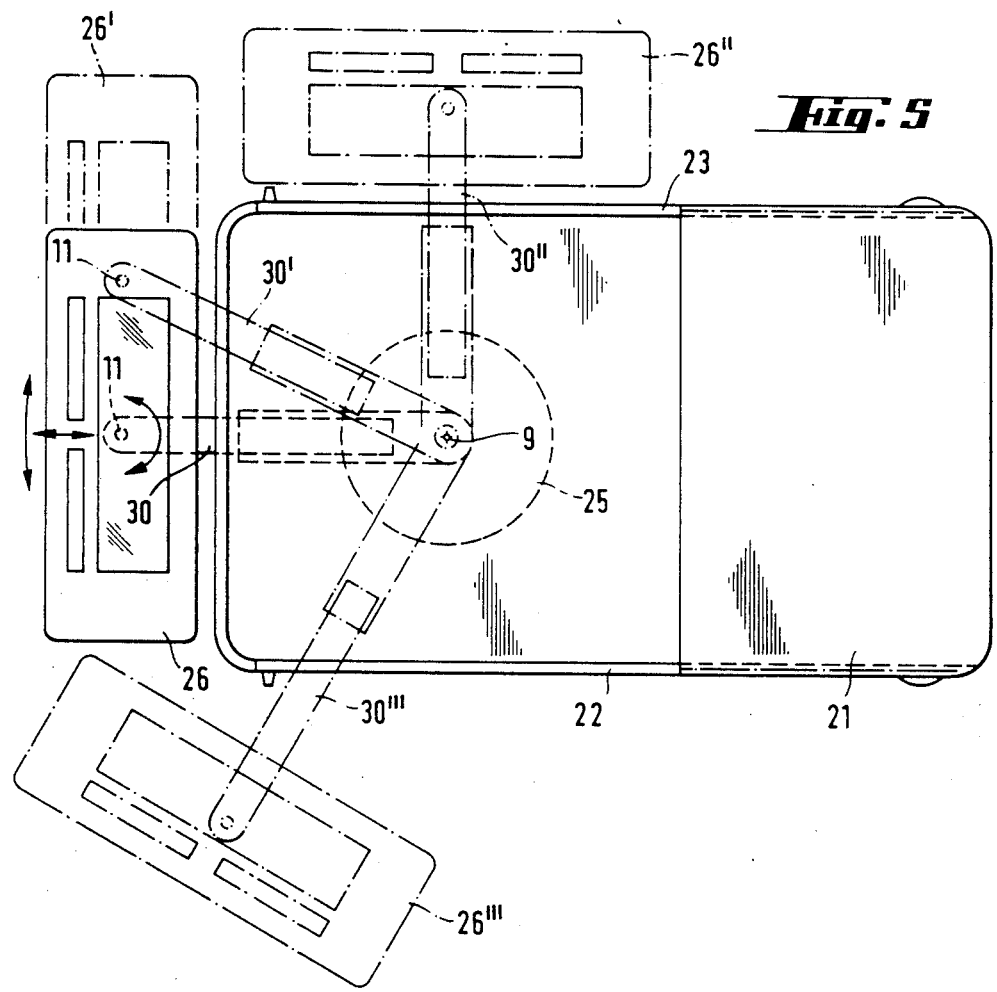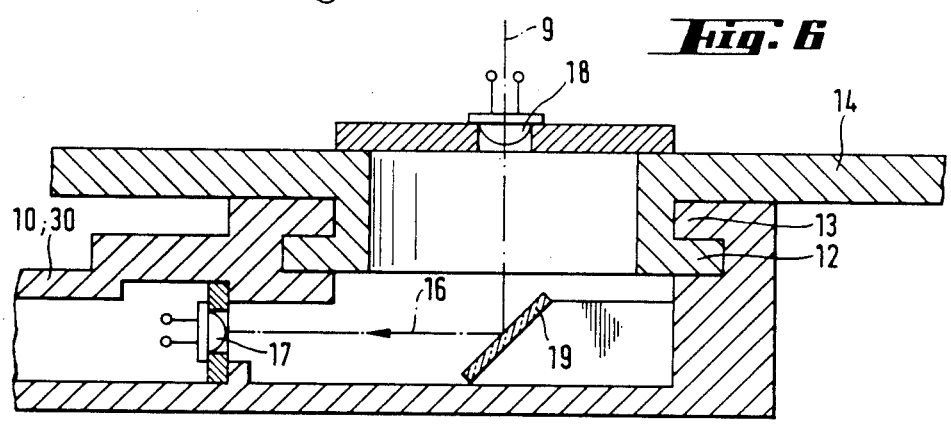

ELECTRONIC BALANCE

BACKGROUND OF THE INVENTION

The invention relates to an electronic balance with a housing, a balance scale, a wind guard which surrounds the balance scale, at least partially, and possesses a display and control unit.

Balances of this type are generally known and are described e.g. in DE-OS 35 08 873 and DE-OS 37 41 313. However, the fixed, reciprocal arrangement of housing, balance scale and display and control unit permits the balance to be adapted only in a limited manner to various work positions by the operator.

The invention therefore has the objective of indicating a balance of the above initially mentioned type which permits a better adaptation to the various work positions of an operator.

The invention solves this objective in that the display and control unit is secured to the housing in such a manner that it can pivot around the wind guard about at least one vertical axis.

This allows the position of the display and control unit to be adapted to the work position of the operator independently of the position of the housing.

SUMMARY OF THE INVENTION

In an advantageous embodiment the wind guard is designed to be symmetrical with respect to rotation about an axis and the axis of rotation of the display and control unit coincides at least approximately with this axis. This embodiment permits an especially simple possibility of pivoting since both the rotationally symmetrical wind guard as well as the display and control unit can pivot about the same axis and thus do not change their mutual distance. Secondly, in the case of the rotationally symmetrical wind guard, the position of its opening slot can be freely selected (of, the already-cited DE-OS 37 41 313), so that in this embodiment both the position of the loading slot as well as the position of the display and control unit can be selected independently of the balance housing.

Advantageous further developments result if the display and control unit has the additional possibility of shifting laterally and/or can be tilted about a horizontal axis and/or can be rotated about a vertical axis within the display and control unit. This results in further possibilities of adjustment for individual adaptation.

The transmission of data from the fixed housing to the movable display and control unit is advantageously performed in an optical or wireless manner in order to avoid the use of customary, flexible copper connection leads.

The invention is described in the following in two embodiments.

BRIEF DESCRIPTION OF THE DRAWINGS

FIG. 5 shows a top view of the balance in a second embodiment with different positions of the display and control unit.

FIG. 6 shows the pivoting device and an optical data transmission in detail.

DETAILED DESCRIPTION OF THE DRAWINGS

Figure 1:
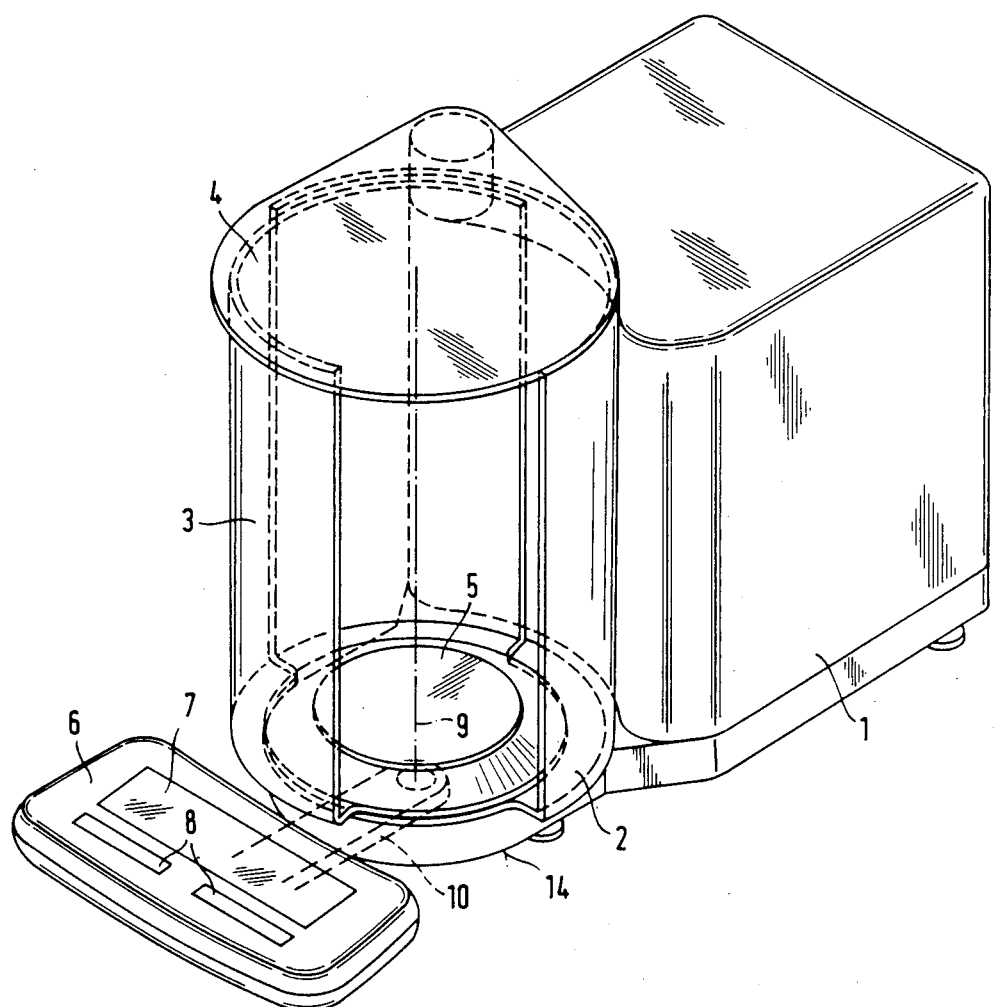
FIG. 1 shows a perspective view of the balance in a first embodiment.

The perspective view of the balance in FIG. 1 shows a housing 1 e.g. for housing the electronic components, further shows a wind guard consisting of two cylindrical elements 2, 3 which can move against one another, shows a balance scale 5 and a display and control unit 6. Display and control unit 6 comprises a display 7 for displaying the weighing result and any additional information and also comprises one or more control keys 8. Other control keys can also be located e.g. adjacent to display 7. The wind guard comprises in addition to the two movable elements 2, 3 a cover 4, which can be pivoted laterally in the embodiment shown in order to make it possible to also load the balance scale from the top. As shown in already-cited DE-OS 37 41 313, the cover can also be divided and the individual parts can be moved together with the corresponding cylindrical wall elements; or, the wind guard can exhibit the shape of a dome or of a cone in which side wall and cover are integrated to one part. The measuring system of the balance can operate in accordance with any method desired. For example, the electromagnetic compensation of force has proven itself.

Figure 2:
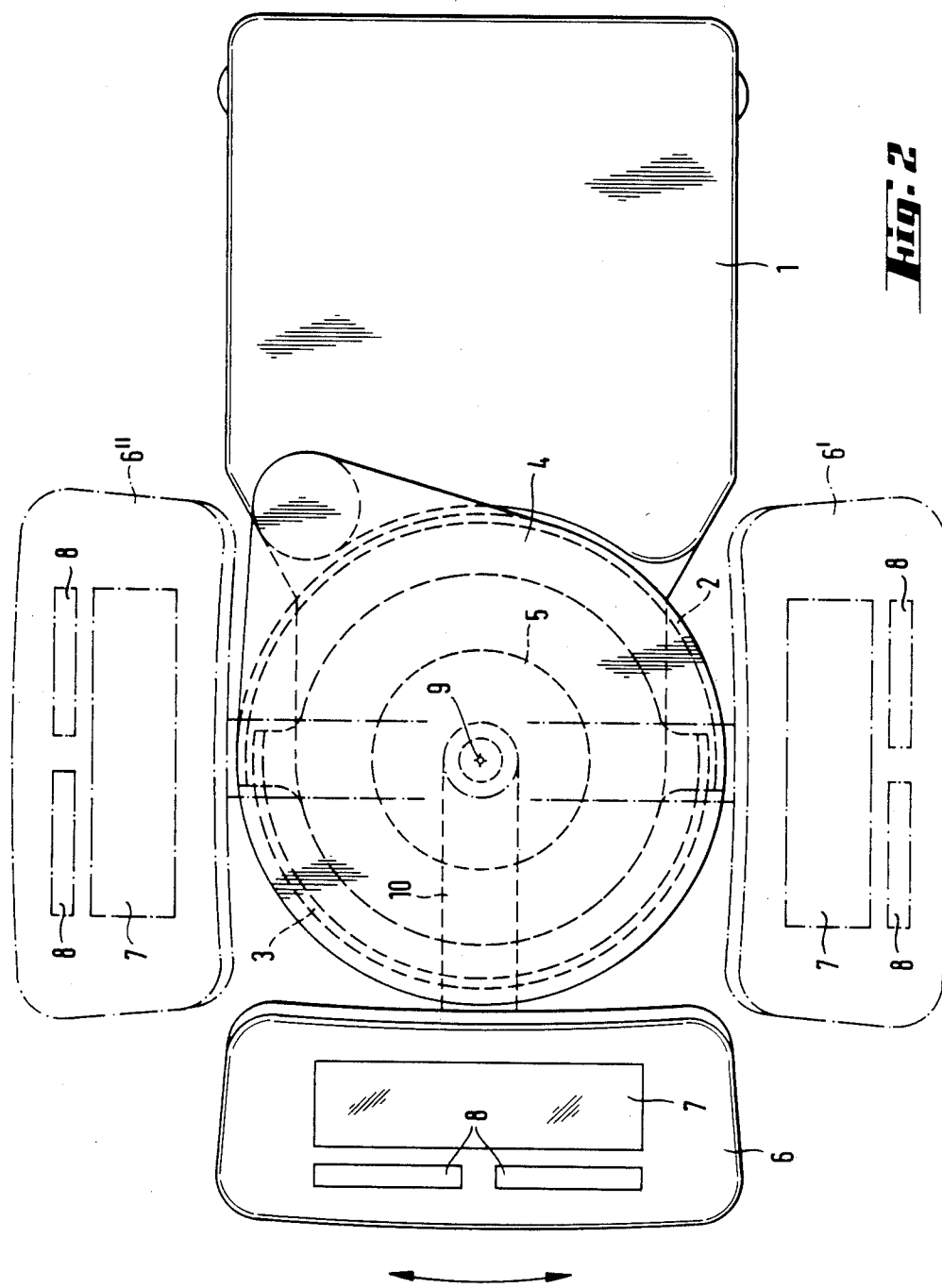
FIG. 2 shows a top view of the balance of FIG. 1 with different positions of the display and control unit.

The top view of FIG. 2 shows three different positions of display and control unit 6 when pivoting about wind guard 2/3. The parts which are the same as in FIG. 1 are designated with the same reference numbers. The middle position of display and control device 6, as it is also shown in FIG. 1, is represented in solid lines. Display and control unit 6 can be brought into any position desired by means of pivoting about axis 9; the two end positions 6' and 6" of the display and control device are shown in dash-dotted lines in FIG. 2. If vertical axis 9, about which the display and control unit can be pivoted, coincides with the axis of cylindrical wind guard 2/3, then the distance of the display and control unit from the wind guard does not change during pivoting and the display and control unit can simply be fastened to a pivotable arm 10.

Figure 3:
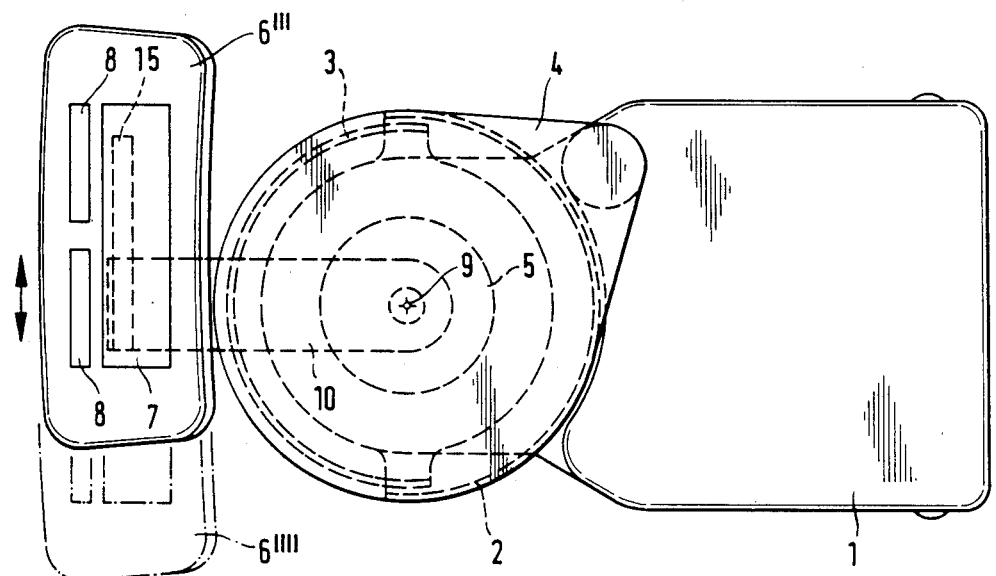
FIG. 3 shows a top view of the balance of FIG. 1 with shifted display and control unit.

FiG. 3 shows an addition possibility for lateral shifting guide 15. Here, display and control device 6 has been laterally shifted. Position 6''' shown in solid lines and the second position 6'''' shown in dash-dotted lines represent the two end positions.

Figure 4:
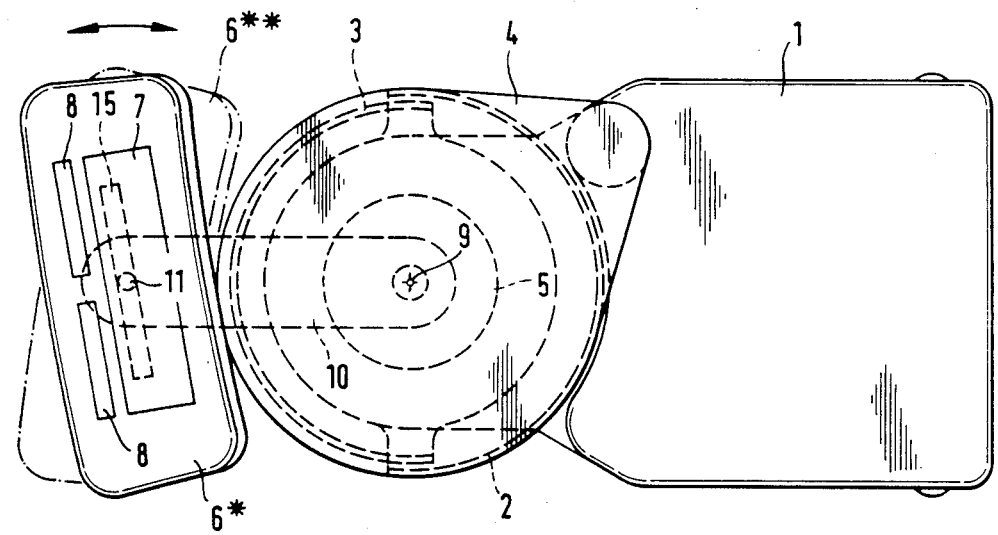
FIG. 4 shows a top view of the balance of FIG. 1 with rotated display and control unit.

FIG. 4 shows an additional possibility of rotating about a vertical axis 11 within the display and control unit. Position 6* of the display and control unit shown in solid lines and position 6** shown in dash-dotted lines again represent the end positions of this additional possibility of rotation.

The further additional possibility of tilting the display and control unit about a horizontal axis is known from DE-GM 81 14 083 and therefore does not need to be explained in more detail here. Combined with the possibility of pivoting, the possibility of tilting furnishes a further possibility of adapting to the individual requirements of the operator and to the needs of special work procedures.

FIG. 5 shows a second embodiment of the balance in a top view. Housing 21 exhibits an approximately rectangular design here and offers a guide for two shiftable lateral elements 22 and 23 as wind guard for balance scale 25. Display and control unit 26 is pivotably attached in front of the weighing area. In accordance with the rectangular form of the weighing area, fastening arm 30 is designed as a telescope so that its length can adapt during pivoting to the contour of the weighing area. The possibility of rotating about a vertical axis within the display and control unit, as has already been shown in FIG. 4 for the embodiment with a cylindrical wind guard, is also provided in this second embodiment. The possible positions of the display and control unit which result therefrom are shown in FIG. 5 in a few examples in dash-dotted lines. In position 26' the display and control unit has been pivoted somewhat, telescopic arm 30' lengthened somewhat thereby and the display and control unit rotated so far about the vertical axis 11 within the display and control unit that the display and control unit again stands parallel to the front side of the housing. In position 26", the display and control unit has been pivoted through 90° and is located directly in front of door 23 of the weighing area. In position 26''' on the opposite side of the weighing area the display and control unit has been pivoted not quite through 90° and telescopic arm 30''' is extended to its maximum length.

The positions of the display and control unit 6 and 26 shown in the figures are only exemplary positions; naturally, all intermediary positions are possible as well as all other positions produced by the pivoting or rotating about the disclosed indicated axes and by the possibility of lateral shifting.

An optical transmission is provided in a first embodiment for transmitting data from the electronic components in housing 1 and 21 to display and control unit 6 and 26 and vice versa. This can take place either via a flexible light-wave guide or in accordance with FIG. 6 via a mirror 19 which is attached at an angle of 45° to pivot arm 10 or 30 in axis of rotation 9, deflects the light of optical transmitter 18, which is fixed to the housing and beams vertically downward, in direction 16 of pivot arm 10 or 30 and allows it to strike an optical receiver 17 there. FIG. 6 also indicates a possible design, of the pivot axis: A flange 12 is fastened under bottom 14 of the weighing area which flange is surrounded in a movable fashion by a corresponding counterpart 13 on pivot arm 10 or 30.

In a second embodiment the transmission of data takes place in a wireless manner, e.g. via an inductive transmitter whose core and first coil are fixed to the housing and arranged in such a manner that the second coil is fastened to pivot arm 10 or 30 and can rotate about the core during pivoting.

Details of these optical and inductive transmitters are known, so that a detailed description is not necessary here.

We claim:

1. An electronic balance with a housing, a balance scale, a wind guard which surrounds the balance scale at least partially and with a display and control unit approximately in the plane of the balance scale comprising a display and control unit fastened to the housing in such a manner that it can pivot around the wind guard along at least one vertical axis.

2. The electronic balance according to claim 1, wherein the wind guard is symmetrical with respect to rotation about an axis and that the axis of rotation of the display and control unit are at least substantially coincidental.

3. The electronic balance according to claim 2, wherein the display and control unit is adapted and constructed to be shifting laterally.

4. The electronic balance according to claim 3, wherein the display and control unit is adapted and constructed to be tiltable about a horizontal axis.

5. The electronic balance according to claim 4, wherein the display and control unit is adapted and constructed to be rotated about a vertical axis within the display and control unit.

6. The electronic balance according to claim 5, wherein optical transmission means is included whereby to transmit data to the display and control unit.

7. The electronic balance according to claim 5, wherein wireless transmission means is included whereby to transmit data to the display and control unit.

* * * * *